United States Patent
Li et al.

(10) Patent No.: US 7,257,273 B2
(45) Date of Patent: Aug. 14, 2007

(54) HIERARCHICAL SCHEME FOR BLUR DETECTION IN DIGITAL IMAGE USING WAVELET TRANSFORM

(76) Inventors: Mingjing Li, Room 341, West Building 5, Daliushu Road, Haidian District, Beijing, 100081 PR (CN); Hao Wu, 155 Westway Rd., Apt. 102, Greenbelt, MD (US) 20770; Hong-Jiang Zhang, Jingshun Road, Chaoyang District, Unit 9, Beijing Riviera, No. 1 Xiang Jiang Bei Lu, Beijing, 100015 PR (CN)

( * ) Notice: Subject to any disclaimer, the term of this patent is extended or adjusted under 35 U.S.C. 154(b) by 807 days.

(21) Appl. No.: 10/646,387

(22) Filed: Aug. 22, 2003

(65) Prior Publication Data

US 2004/0066981 A1 Apr. 8, 2004

Related U.S. Application Data

(63) Continuation-in-part of application No. 10/374,934, filed on Feb. 26, 2003, now abandoned, which is a continuation of application No. 09/833,525, filed on Apr. 9, 2001, now Pat. No. 6,548,800.

(51) Int. Cl.
  *G06K 9/36* (2006.01)
  *G06K 9/46* (2006.01)
(52) U.S. Cl. ............ 382/286; 382/199; 382/240; 375/240.19
(58) Field of Classification Search ........... 382/199, 382/240, 264, 274, 275, 286, 300, 302; 375/240.19, 375/240.27, 254
See application file for complete search history.

(56) References Cited

U.S. PATENT DOCUMENTS

| | | | |
|---|---|---|---|
| 3,627,920 A * | 12/1971 | Schroeder et al. | 382/112 |
| 5,717,791 A * | 2/1998 | Labaere et al. | 382/274 |
| 6,253,175 B1 * | 6/2001 | Basu et al. | 704/231 |
| 6,381,035 B1 * | 4/2002 | Zhang et al. | 358/1.9 |
| 6,611,627 B1 * | 8/2003 | LaRossa et al. | 382/240 |
| 6,628,842 B1 * | 9/2003 | Nagao | 382/266 |
| 6,825,780 B2 * | 11/2004 | Saunders et al. | 341/50 |
| 7,054,507 B1 * | 5/2006 | Bradley et al. | 382/300 |

OTHER PUBLICATIONS

S. Obata et al. (Image Restoration using Plural Blurred Images by means of Multi-resolution Analysis, pp. 259-363, IEEE-1997).*
M. Michael Chang. et al. (Blur Identification Using the Bispectrum, pp. 2323-2325, IEEE 1991).*

* cited by examiner

*Primary Examiner*—Kanjibhai Patel
(74) *Attorney, Agent, or Firm*—Lee & Hayes, PLLC

(57) ABSTRACT

Methods and apparatuses are provided for detecting blur within digital images using wavelet transform and/or Cepstrum analysis blur detection techniques that are able to detect motion blur and/or out-of-focus blur.

27 Claims, 8 Drawing Sheets

HIERARCHICAL SCHEME FOR BLUR DETECTION IN DIGITAL IMAGE USING WAVELET TRANSFORM

RELATED PATENT APPLICATIONS

This U.S. Non-provisional Application for Letters Patent is a continuation-in-part of U.S. application for Letters Patent Ser. No. 10/374,934, filed Feb. 26, 2003 now abandoned, and titled "Image Blur Detection Methods and Arrangements", which is a continuation of U.S. application for Letters Patent Ser. No. 09/833,525, filed Apr. 9, 2001, and titled "Image Blur Detection Methods and Arrangements" now U.S. Pat. No. 6,548,800. The present U.S. Non-provisional Application for Letters patent claims the benefit of priority from these earlier patent applications and hereby incorporates by reference the entire disclosure of each of these earlier patent applications.

TECHNICAL FIELD

The present invention relates generally to computer imaging, and more particularly to improved image blur detection methods and apparatuses.

BACKGROUND

With the increasing popularity of personal computers, handheld appliances and the like, there has been a corresponding increase in the popularity and affordability of image rendering/manipulation applications.

Thus, for example, many personal computers and workstations are being configured as multimedia devices that are capable of receiving image data, for example, directly from a digital camera or indirectly from another networked device. These so-called multimedia devices are further configured to display the image data (e.g., still images, video, etc.). As for still images and single video frames, most multimedia devices can be further coupled to a printing device that is configured to provide a printed hardcopy of the image data.

When provided with the appropriate software application(s), the multimedia device can be configured to allow the user to manipulate all or portions of the image data in some manner. For example, there is a variety of photo/drawing manipulation applications and video editing applications available today. One example of a photo/drawing manipulation program is PhotoDraw® 2000, available from the Microsoft Corporation of Redmond, Wash. Another example of an image manipulation program is Picture It! 2000, also available from the Microsoft Corporation. One example of a video editing application is Adobe Premiere 6.0 available from Adobe Systems Incorporated of San Jose, Calif.

These and other image manipulation programs provide a multitude of image editing tools/features. In some instances, for example, in the key-frame evaluation and photo quality estimation features of Picture It! 2000, the image manipulation program may need to calculate certain characteristics associated with the image data in terms of its' blurriness/sharpness. Doing so allows for the user and/or the application to selectively or automatically manipulate blurred image data in some desired fashion. For example, a blurred portion of the image may be sharpened or perhaps protected from additional blurring.

With this in mind, previous methods for calculating blur characteristics have been designed for image restoration. By way of example, see the article by M. C. Chiang and T. E. Boult, titled "Local Blur Estimation and Super-Resolution", as published in Proc. IEEE Computer Society Conference on Computer Vision and Pattern Recognition, pp. 821-826, June 1997. Also, for example, see the article by R. L. Lagendijk, A. M. Tekalp and J. Biemond, titled "Maximum Likelihood Image and Blur Identification: A Unifying Approach" as published in Optical Engineering, 29(5):422-435, May 1990.

These exemplary conventional techniques utilize methods that estimate the parameters needed by the reverse process of blur. Unfortunately, these methods tend to be complex and time-consuming.

Still other techniques utilize compressed domain methods based on discrete cosine transform (DCT) coefficient statistics, which can be used to estimate the blurriness of motion picture expert group (MPEG) frame in real-time. For example, see the methods presented by Xavier Marichal, Wei-Ying Ma and HongJiang Zhang at the International Conference on Image Processing (ICIP) in Kobe, Japan on Oct. 25-29, 1999, as published in an article titled "Blur Determination in the Compressed Domain Using DCT Information". Unfortunately, these methods often find it difficult to handle images with relatively large uni-color patches.

Hence, there is an on-going need for improved methods and apparatuses for calculating or otherwise determining blurriness/sharpness characteristics in an image.

SUMMARY

The above stated needs and others are met, for example, by a method that includes accessing at least a portion of a digital image, and determining if at least the portion is blurred based on a wavelet transform blur detection process and/or a Cepstrum analysis blur detection process.

In certain implementations, for example, the wavelet transform blur detection process includes wavelet transforming at least the portion of the digital image to produce a plurality of corresponding different resolution levels wherein each resolution level including a plurality of bands. The wavelet transform blur detection process also includes generating at least one edge map for each of the resolution levels, and detecting blur in at least the portion of the digital image based on the resulting edge maps.

In certain implementations, for example, the Cepstrum analysis blur detection process includes dividing the image into a plurality of parts and determining a Cepstrum for each of the parts. In certain implementations, the Cepstrum analysis blur detection process also includes blurring at least one boundary within the image and calculating an elongation of each resulting binarized Cepstrum image. The method may further include determining that the image includes motion blur and/or out-of-focus blur based on the calculated elongations.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
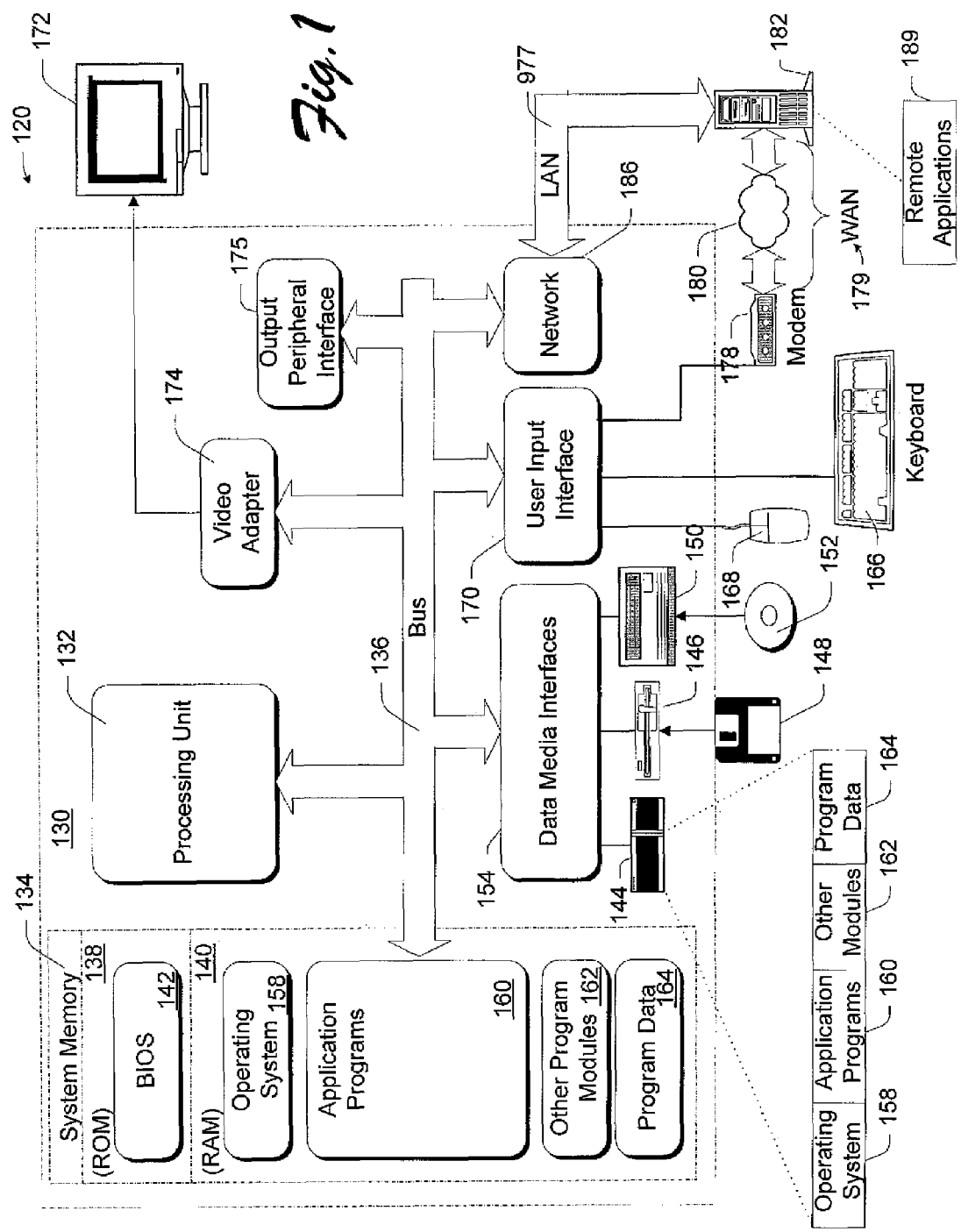
FIG. 1 is a block diagram that depicts an exemplary device, in the form of a computer, which is suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and apparatuses may be implemented.

Exemplary computing environment 120 is only one example of a suitable computing environment and is not intended to suggest any limitation as to the scope of use or functionality of the improved methods and apparatuses described herein. Neither should computing environment 120 be interpreted as having any dependency or requirement relating to any one or combination of components illustrated in computing environment 120.

The improved methods and apparatuses herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and apparatuses described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

This description will now focus on certain aspects of the present invention associated with image processing/handling.

Human vision often relies upon visible edge transitional information to evaluate the quality of an image. For example, when looking at an image of a completely white painted smooth wall it would be difficult, if not impossible, for a person to determine if the image or a portion thereof is blurred. However, if a black line has been drawn across the surface of the wall, a person would be more likely to determine if the image or at least the portion containing the black line is blurred. For example, if the entire image is blurred, than the black line will appear fuzzy, wider, and/or perhaps gray, etc., as would be expected for a blurred line/image.

Recognizing this human ability to detect the blurriness/sharpness of a line or color/pattern based on the edges, the exemplary methods and apparatuses described herein provide a similar technique for devices.

Figure 2:
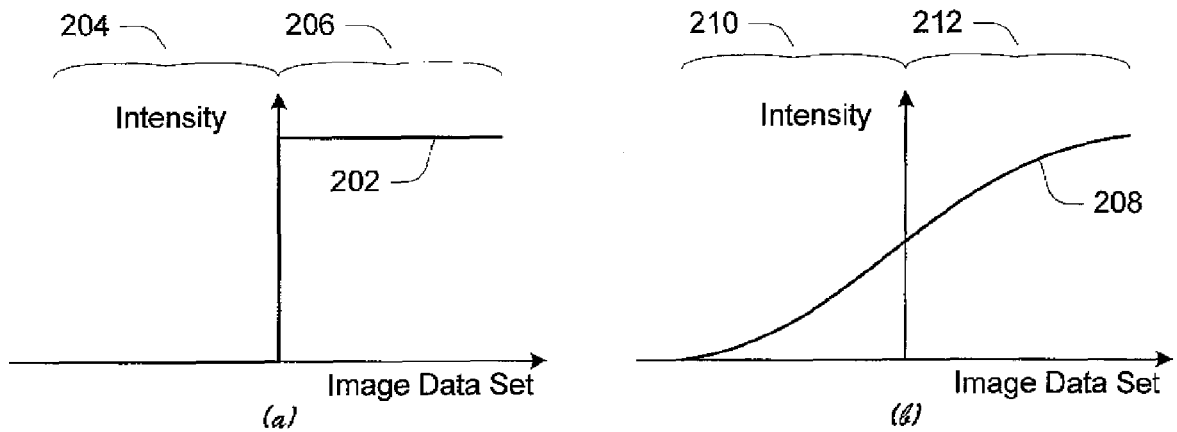
FIGS. 2a-b are line graphs depicting a step edge and a smoothed step edge, respectively, within exemplary images.

With this in mind, attention is drawn to FIGS. 2*a-b*, which are line graphs depicting a step edge and a smoothed step edge, respectively, within exemplary images. These line graphs depict the changing amplitudes of the image data at a certain points (e.g., pixels). The step edge, as represented by line 202 in FIG. 2*a*, illustrates that the amplitude of the image data changes abruptly between a first portion of the image (region 204) and a second portion of the image (region 206). This so-called step edge would tend to indicate that the image at regions 204 and 206 is more than likely not blurred, but instead is significantly sharp.

To the contrary, the smoothed step edge, as represented by line 208 in FIG. 2*b*, illustrates that the amplitude of the image data changes gradually between a first portion of the image (region 210) and a second portion of the image (region 212). This so-called smoothed step edge would tend to indicate that the image at regions 210 and 212 is more than likely blurred, since it is not as sharp a change as the step edge in FIG. 2*a*.

Figure 3:
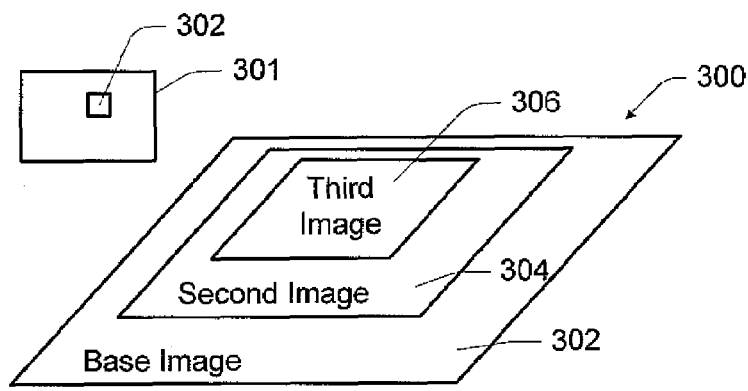
FIG. 3 is an illustrative representation of a multi-scale image pyramid having a plurality of different resolutions of the same image.

Reference is now made to FIG. 3, which is an illustrative representation of a multi-scale image pyramid 300 having a plurality of different resolutions of the same image.

Multi-scale image pyramid 300, as will be described in greater detail below, provides a basis for determining if a detected edge within an image is sufficiently blurred enough to be considered blurred or if the detected edge is sufficiently sharp enough to be considered sharp (or not blurred).

In this example, multi-scale image pyramid 300, includes a base image 302 (which may be part of a larger original image 301, for example) having a resolution of 100×100 pixels, a corresponding second image 304 having a reduced resolution of 75×75 pixels, and a corresponding third image 306 having an even more reduced resolution of 50×50 pixels. Here, second image 304 and third image 306 have each been generated from base image 302 using conventional resolution reduction techniques.

While exemplary multi-scale image pyramid 300 includes three levels of resolution, those skilled in the art will recognize that the methods and apparatuses described herein may be implemented with a greater or lesser number of multi-scaled images, as required.

Figure 4:
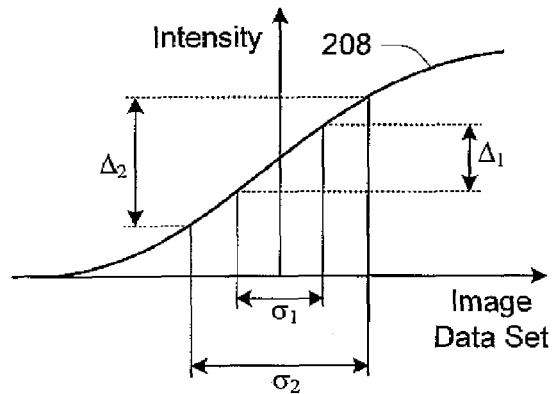
FIG. 4 is a line diagram depicting exemplary corresponding multi-scale edge amplitudes.

With this in mind, based on multi-scale image pyramid 300, FIG. 4 illustrates the amplitude of a smoothed step edge associated with two different corresponding image resolutions, in accordance with certain aspects of the present invention.

Here, a differential operator is applied on the smoothed step edge. As shown, the edge amplitude $\Delta$ will change according to the size $\sigma$ the differential operator. Let $\sigma_1$ and $\Delta$ be associated with a lower resolution image in multi-scale image pyramid 300, and $\sigma_2$ and $\Delta$ be associated with a higher resolution image in multi-scale image pyramid 300. As shown, if $\sigma_1 > \sigma_2$, then $\Delta > \Delta$. This property would not exist for a sharp edge. Thus, a multi-scale edge amplitude comparison can be used to detect the blurriness/sharpness of images or portions thereof.

In accordance with certain aspects of the present invention, as described in the exemplary methods and apparatuses below, multi-scaled images are used instead of multi-scale differential operators to reduce the computation complexity.

Figure 5:
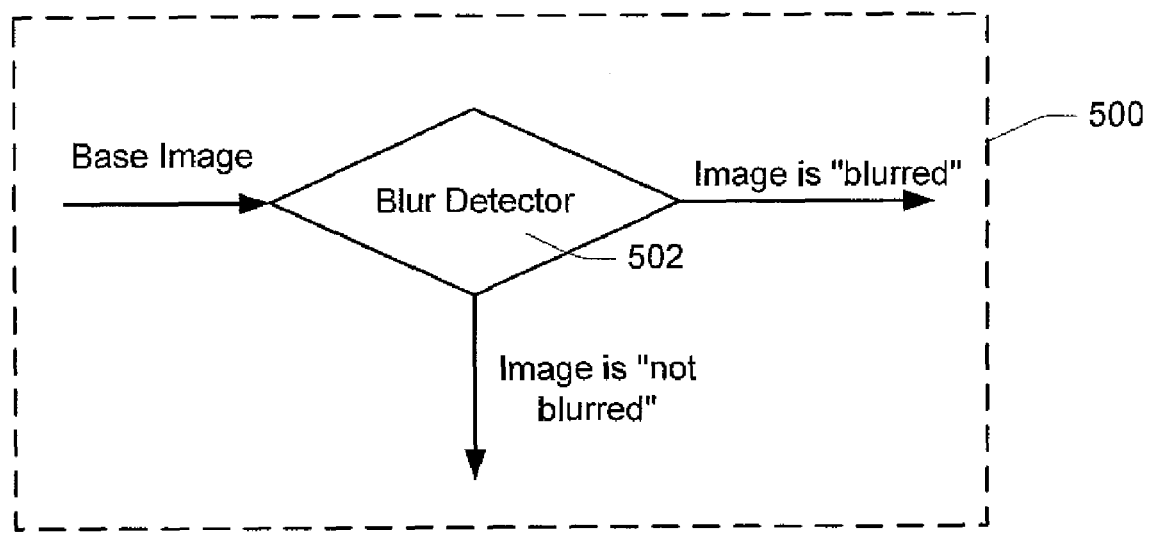
FIG. 5 is a block diagram associated with an exemplary blur detector system architecture.

FIG. 5 presents a block diagram associated with an exemplary blur detector system architecture.

Here, an image handling mechanism 500 (e.g., an image rendering and/or manipulation application, or like device/arrangement) includes a blur detector 502 that is configured to receive or otherwise access base image 302 (which may be all or part of an original image) and to determine if base image 302 is "blurred" or "not blurred" according to certain selectively defined parameters.

Figure 6:
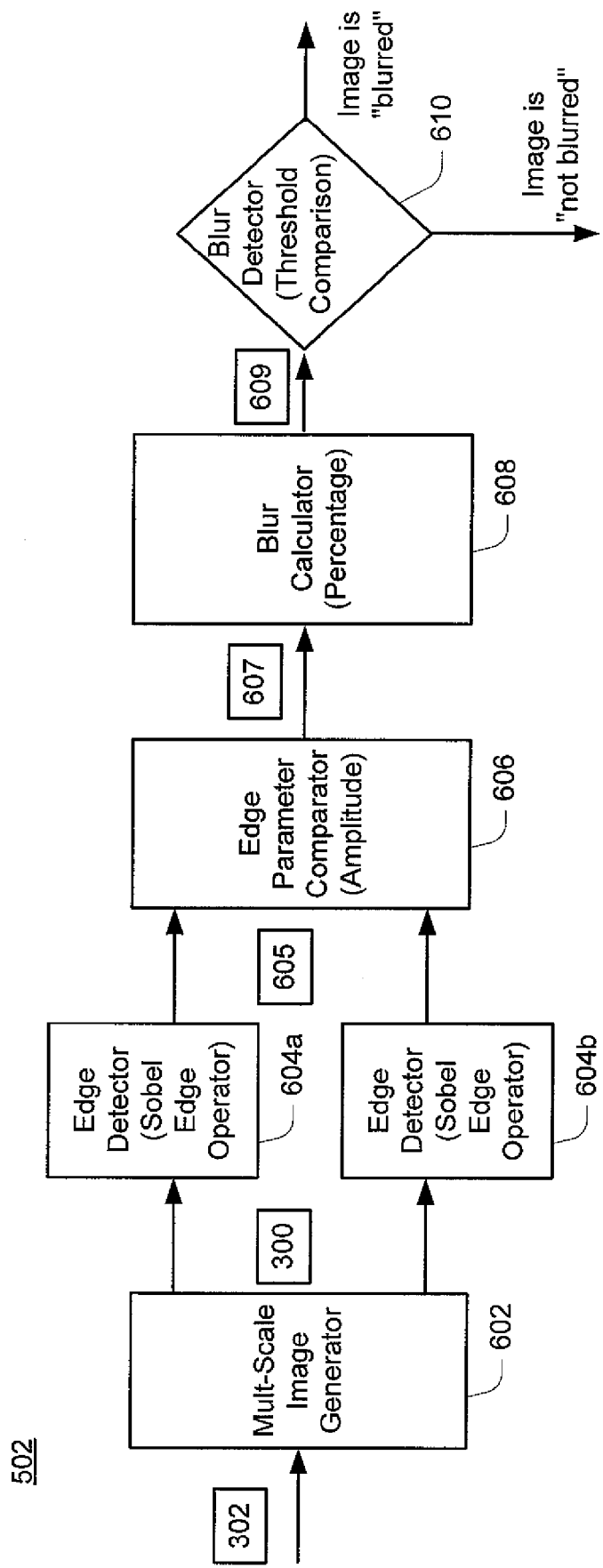
FIG. 6 is a block diagram associated with an exemplary blur detector algorithm for use in the blur detector system architecture of FIG. 5.

FIG. 6 is a block diagram associated with an exemplary blur detector algorithm for use in blur detector 502 of FIG. 5.

As depicted, blur detector 502 includes a series of functional blocks that process base image 302 and determine if it is "blurred" or "not blurred". First, base image 302 is provided to a multi-scale image generator 602, which is configured to generate the images in multi-scale image pyramid 300 (FIG. 3). Next, the resulting multi-scale images are provided to one or more edge operators or detectors, in this example, Sobel edge operators 604a-b. The edge operators calculate an edge amplitude on each of the pixels of an image. Pixels having an edge amplitude greater than a preset threshold are called "edge pixels". The edge operators produce corresponding multi-scale edge maps 605, which are then provided to a multi-scale edge amplitude comparator 606. A resulting edge amplitude comparison map 607 is then provided to a blur percentage calculator 608, which produces at least one blurriness measurement, in this example, a blur percentage 609, which is then provided to threshold detector 610. Threshold detector 610 determines if the blurriness measurement(s) is within or without at least one threshold range. For example, blur percentage 609 can be compared to a defined, selectively set threshold blur percentage.

In this manner a comparison of edge amplitudes for various resolutions of base image 302 is made. For a given detected edge pixel of third image 306, if the edge amplitude is greater than the corresponding edge amplitude of second image 304, and if the edge amplitude of second image 304 is greater than the corresponding edge amplitude of base image 302, then the detected edge pixel is mapped in result map 607 as "blurred". This process is completed for all detected edge pixels of third image 306. Blur percentage 609 of base image 302 can then be calculated by comparing the number of pixels that are "blurred" in result map 607 with the total number of edge pixels of third image 306. Thus, for example, in FIG. 3 if there are 1,000 edge pixels in third image 306, assuming 700 of them have been mapped as "blurred", then blur percentage 609 would equal 70%. If the threshold percentage is set to 65%, then threshold detector 610 would consider base image 302 as being "blurred". Conversely, if the threshold percentage is set to 75%, then threshold detector 610 would consider base image 302 as being "not blurred".

Moreover, by selectively controlling the size of base image 302, one can further determine if a portion of a larger image, as represented by base image 302, is blurred or not blurred. This may also be determined from result map 607. Hence, it may be useful to provide additional details as to which regions may or may not be determined to be blurred. Further implementations may allow for additional threshold values, or ranges, that provide additional feedback to the user and/or image handling mechanism 500.

As illustrated herein, blur is a common degradation in digital images. Losing focus and camera shaking are two common problems that give rise to blur. In order to recover or discard the blurred pictures automatically, there is a need to determine automatically whether a picture is blurred or not.

Since the mechanisms of out-of-focus blur (caused by losing focus) and motion blur (caused by hand shaking) are different, two different techniques are adopted, either together or separately in accordance with certain further aspects of the present invention. The techniques include wavelet edge detection and Cepstral analysis. The former technique can detect large blurred edges which often occur in out-of-focus blurred pictures, while the latter technique is efficient in detecting motion blur. Moreover, since the applied Cepstral analysis does not consider edges, it is also good for texture and near-smooth areas where simple and large edges are hard to find.

The Wavelet-based technique is highly correlated to the techniques described above with exemplary additional improvements being that a Wavelet transform is used to generate multi-scale images and detect edges, and/or that a different criterion can be adopted to determine whether an image is blurred.

One direct method to detect out-of-focus blur is to see whether the edges in the picture are sharp enough. When such blur occurs, the sharp edges in the world will generically project to the image as blurred luminance transitions. The blurred edges seem to get wider and lose their sharpness. If observed in a small scale, these blur edges will become thinner and recover their sharpness while the sharp edges will remain the same. Therefore, examining the difference of image edges in multi-scales can provide an analysis to out-of-focus blurs. This examination can be calculated in the spatial domain, foe example, using various known edge detectors.

Here, in accordance with certain exemplary implementations a Wavelet transform is adapted for use in conducting edge analysis. The Wavelet transform is well known for its multi-resolution analysis ability. When used for edge detection, the wavelet transform can provide the edges under different scales directly, which can facilitate the further processing.

Figure 7:
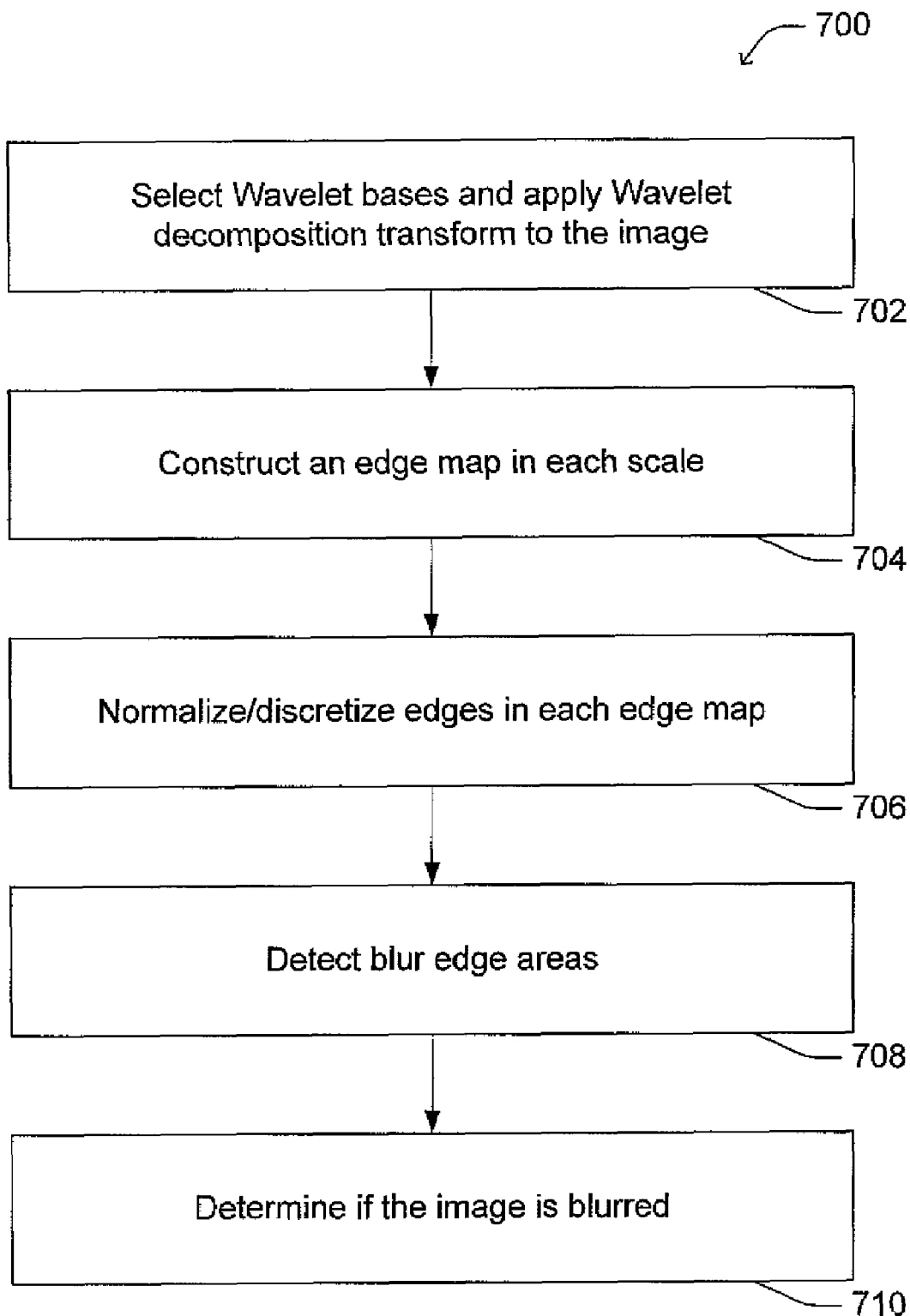
FIG. 7 is a flow diagram depicting a method in accordance with certain exemplary implementations of the present invention that uses a Wavelet transform to help detect blurred images.

Attention is drawn to the flow diagram in FIG. 7, which depicts a method 700. Method 700 includes acts 702-710 as described below, in accordance with certain exemplary implementations of the present invention:

Act 702: Choose a suitable wavelet bases and apply a wavelet decomposition transform to the image. By way of example, in certain implementations, a second order B-spline wavelet bases was selected. As such, the corresponding decomposition filters in this example were:

$h_n = h_{-n}$,  $g_n = -g_{-n}$
$h_1 = 0.3750$,  $h_2 = 0.1250$,
$g_1 = 0.5798$,  $g_2 = 0.0869$,  $g_3 = 0.0061$,
else $h_i, g_i = 0$.

In this example, the decomposition level is set to three. At each level, the image is decomposed into four bands, LL, LH, HL, and HH. The decomposition result of wavelet transform has a hierarchical pyramid-like structure. Exemplary structures of the resulting image and the wavelet coefficient node with the corresponding children in the tree decomposition are illustrated in FIG. 8a and FIG. 8b, respectively.

Figure 8A:
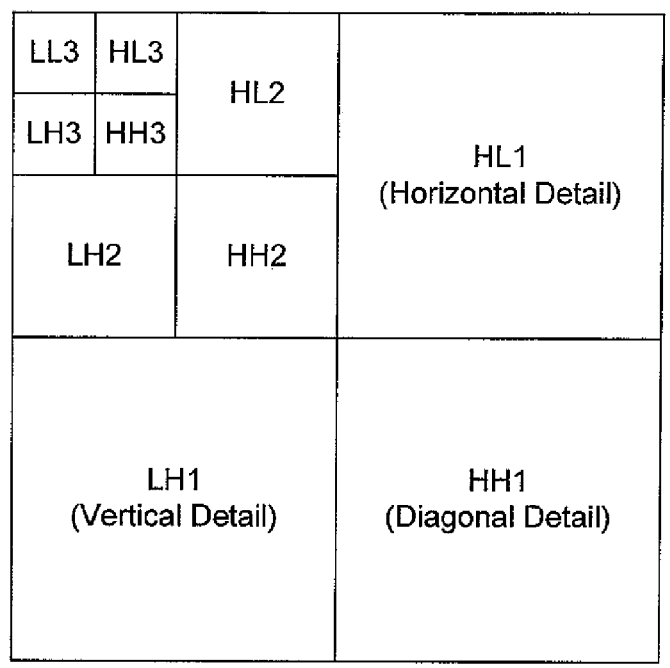
FIG. 8a and FIG. 8b are illustrative diagrams depicting certain features associated with Wavelet transformed image data, in accordance with certain exemplary implementations of the present invention.

Here, for example, FIG. 8*a* illustrates a pyramid of images with relative subbands. HH is horizontal high-pass/vertical high-pass, HL is horizontal high-pass/vertical low-pass, LH is horizontal low-pass/vertical high-pass. The subband LL is iteratively split as shown. Note that for color images, e.g., having three channels, there are three pyramids (one for each channel).

Figure 8B:
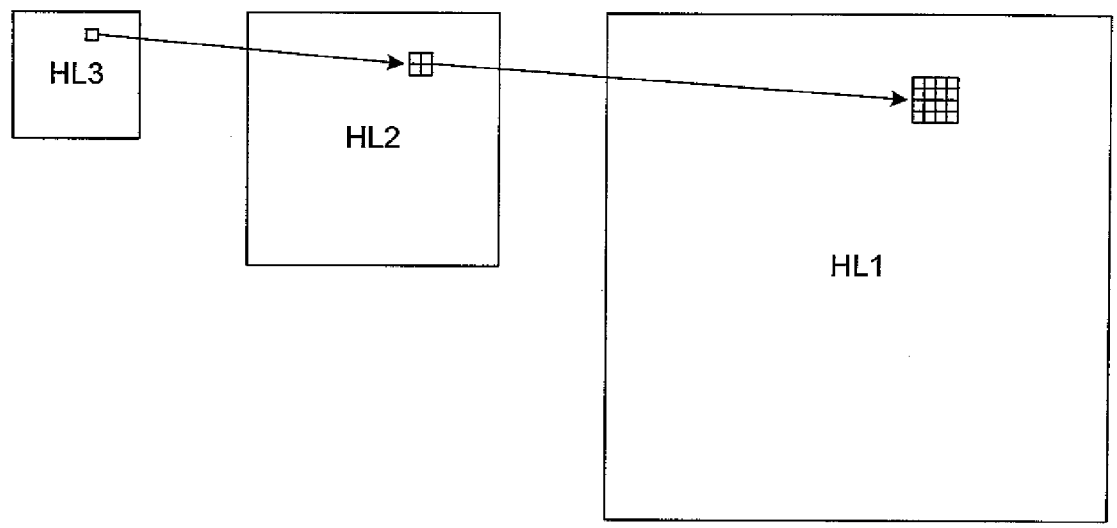

FIG. 8*b* illustrates a Wavelet coefficient node with the corresponding children in the tree decomposition. Here, in this example, each coefficient (except for the coarsest subband) has four children.

Act 704: Construct an edge map in each scale. In order to facilitate expression, we use $I_{iv}$, $I_{ih}$, $I_{id}$ to denote $LH_i$, $HL_i$, $HH_i$ band respectively. We construct the edge map in scale i as follows:

$$Emap_i(k, l) = \sqrt{I_{iv}^2(k, l) + I_{ih}^2(k, l) + I_{id}^2(k, l)}$$

where (k, l) is the coordinate of a pixel in scale i.

Act 706: Normalize and discretize the edges in each edge map. To compare the amplitude variations of corresponding edges in different scales objectively, one may first normalize the total edge amplitude of each edge map:

$$Emap_i(k,l) = Emap_i(k,l)/\max(Emap_i)$$

Then one may partition the edge maps into small blocks and calculate the maximal edge amplitude in each block, which is used to represent that block. The block size in the lowest resolution in the example herein is 2*2, the corresponding size in the next higher resolution is 4*4 and the highest one is 8*8. Therefore the number of blocks is the same in each map. One can use $Emax_i$ to denote the discretization result of $Emap_i$.

Act 708: Detect the blur edge area. One may then compare the amplitude variations of corresponding edge nodes in the three edge maps of different scales. Because the edge points have been discretized in this example the difference can be easily calculated out.

$$Dmap(i, j) = \sqrt{(Emax_3(i, j) - Emax_2(i, j))^2 + (Emax_2(i, j) - Emax_1(i, j))^2}$$

Here, in the difference map Dmap, the position of large values corresponds to the blurred edges, because the clear edge amplitudes almost remain the same in different scales.

Act 706: Determine if the image is blurred. From the difference map Dmap, a binary difference map BDmap can be obtained in the following exemplary way, $$BDmap(i,j)=1 \text{ if } Dmap(i,j)>t1$$

$$BDmap(i,j)=0 \text{ otherwise}$$

where t1 is predefined threshold, which can be determined experimentally for example.

Block (i,j) is deemed to be blurred if BDmap(i,j)=1.

If the percentage of blurred blocks exceeds another predefined threshold t2, the image is determined to be blurred. Again, t2 may also be determined experimentally, for example.

Exemplary techniques will now be described that utilize Cepstral analysis to identify blur and/or de-blur images.

It was found that the multi-scale edge analysis method may be less efficient in certain situations. For example, multi-scale edge analysis may be less efficient in dealing with texture or texture-like areas, and/or motion-blurred images. Hence, in accordance with certain further implementations of the present invention, Cepstrum analysis may be employed to overcome these and other like situations.

Given the image I, its real Cepstrum is defined as:

$$C(f)=\text{real}(FFT^{-1}(\log(|FFT(I)|)))$$

Figure 9:
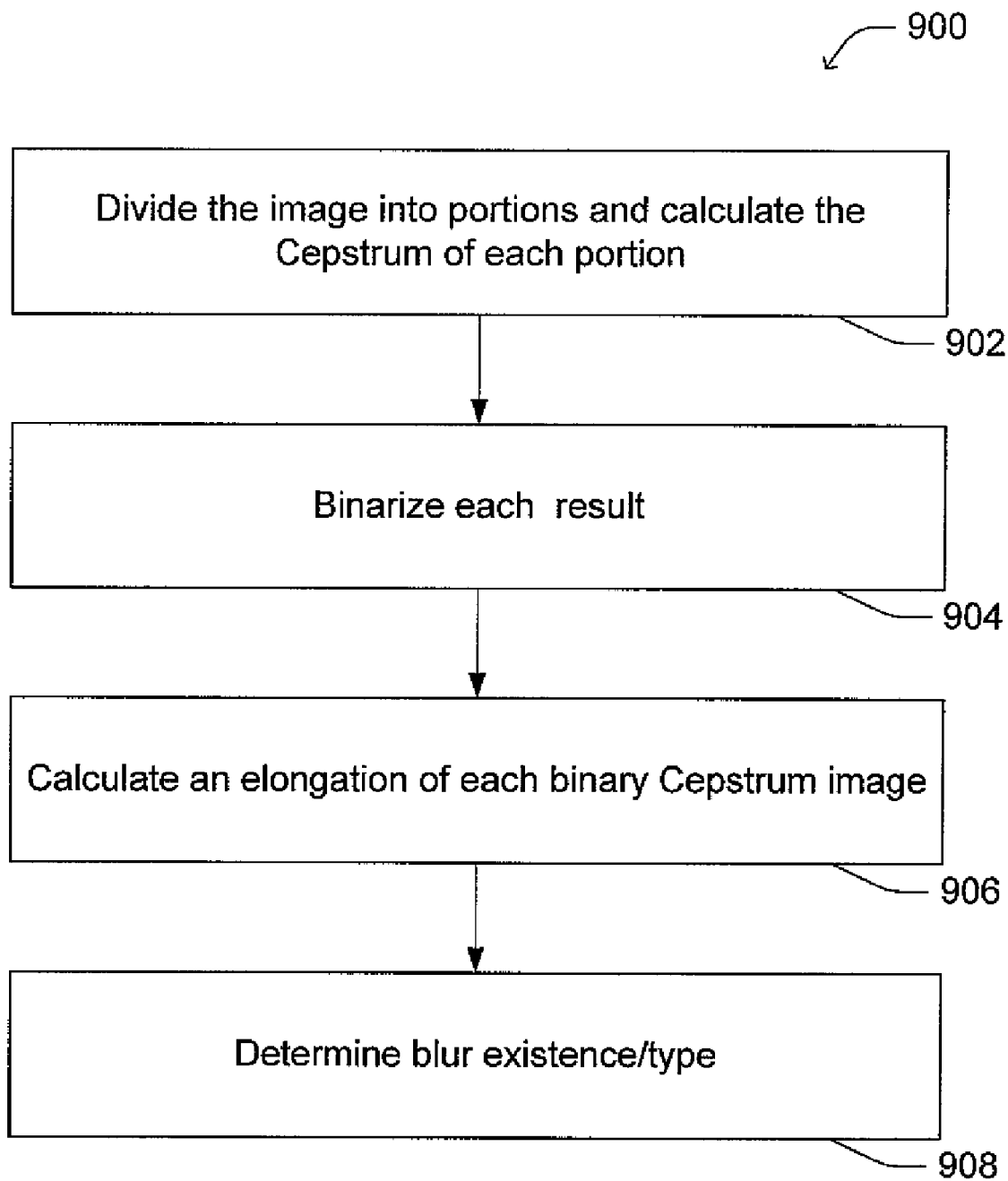
FIG. 9 is a flow diagram depicting a method in accordance with certain exemplary implementations of the present invention that uses Cepstral analysis to help detect blurred images.

Attention is now drawn to FIG. 9, which is a flow diagram depicting and exemplary method 900 in accordance with certain exemplary implementations of the present invention. Method 900 is configured here to detect blurs in the image by employing Cepstrum analysis and includes, for example, the following acts:

Act 902: Divide the image into small separate parts and calculate the Cepstrum of each part.

Optionally/alternatively, to avoid boundary effects, one may blur the boundaries before performing this type of Cepstral operation. By way of example, in certain implementations, a point spread function (PSF) included a circular averaging filter within the square matrix. One can use this PSF, for example, to blur the small parts $I_{ij}$ first and get the blurred local images $BI_{ij}$:

$$BI_{ij}=\text{real}(FFT^{-1}(FFT(I_{ij})*FFT(PSF)))$$

Here, the output image $J_{ij}$ is the weighted sum of the original local image $I_{ij}$ and its blurred version $BI_{ij}$. The weighting array makes $J_{ij}$ equal to $I_{ij}$ in its central region, and equal to the blurred version of $BI_{ij}$ near the edges. That is:

$$J_{ij}(x,y)=\alpha(x,y)*I_{ij}+(1-\alpha(x,y))*BI_{ij}(x,y)$$

Then one can do a Cepstral transform to each $J_{ij}$:

$$CI_{ij}=\text{real}(FFT^{-1}(\log(|FFT(J_{ij})|)))$$

Act 904: Binarize each CI.

$$BCI(x,y)=1 \text{ if } CI(x,y)/\max(CI)>t3$$

$$BCI(x,y)=0 \text{ otherwise,}$$

where t3 is a threshold.

Act 906: Calculate the elongation of each binary Cepstrum image.

Elongation is sometimes referred to as eccentricity. Elongation in this example is the ratio of the maximum length of line or chord that spans the regions to minimum length chord. One may also use moments to calculate the elongation and principal axes of the sub-regions.

The ij th discrete central moment $\mu_{ij}$ of a region is defined by $$\mu_{ij} = \sum_{BCI(x,y)=1} (x - \bar{x})^i (y - \bar{y})^j$$

Where $(\bar{x},\bar{y})$ is the centre of the region:

$$\bar{x} = \frac{1}{n}\sum_{BCI(x,y)=1} x \text{ and } \bar{y} = \frac{1}{n}\sum_{BCI(x,y)=1} y$$

Note that, n, the total number of points contained in the region, is a measure of its area.

One can define eccentricity, for example, using moments as:

$$\text{eccentricity} = \frac{\mu_{20} + \mu_{02} + \sqrt{(\mu_{20} - \mu_{02})^2 + 4\mu_{11}^2}}{\mu_{20} + \mu_{02} - \sqrt{(\mu_{20} - \mu_{02})^2 + 4\mu_{11}^2}}$$

One may also find principal axes of inertia that define a natural coordinate system for a region.

$$\theta = \frac{1}{2}\tan^{-1}\left[\frac{2\mu_{11}}{\mu_{20} - \mu_{02}}\right]$$

Act 908: Determine the blur existence and type.

In accordance with certain implementations, one may use the following exemplary criterion to judge motion blurred pictures.

If more than one third sub-regions have an elongation larger than a threshold L and the maximum difference between the corresponding principal axes is less than another threshold $\Delta\theta$, then one may consider that the image has motion blur.

For out-of-focus blur, one may apply the following exemplary criterion:

If more than one third sub-regions have an area larger than a threshold A and the corresponding elongations are less than a threshold T, then one may consider the image to have out-of-focus blur.

Figure 10:
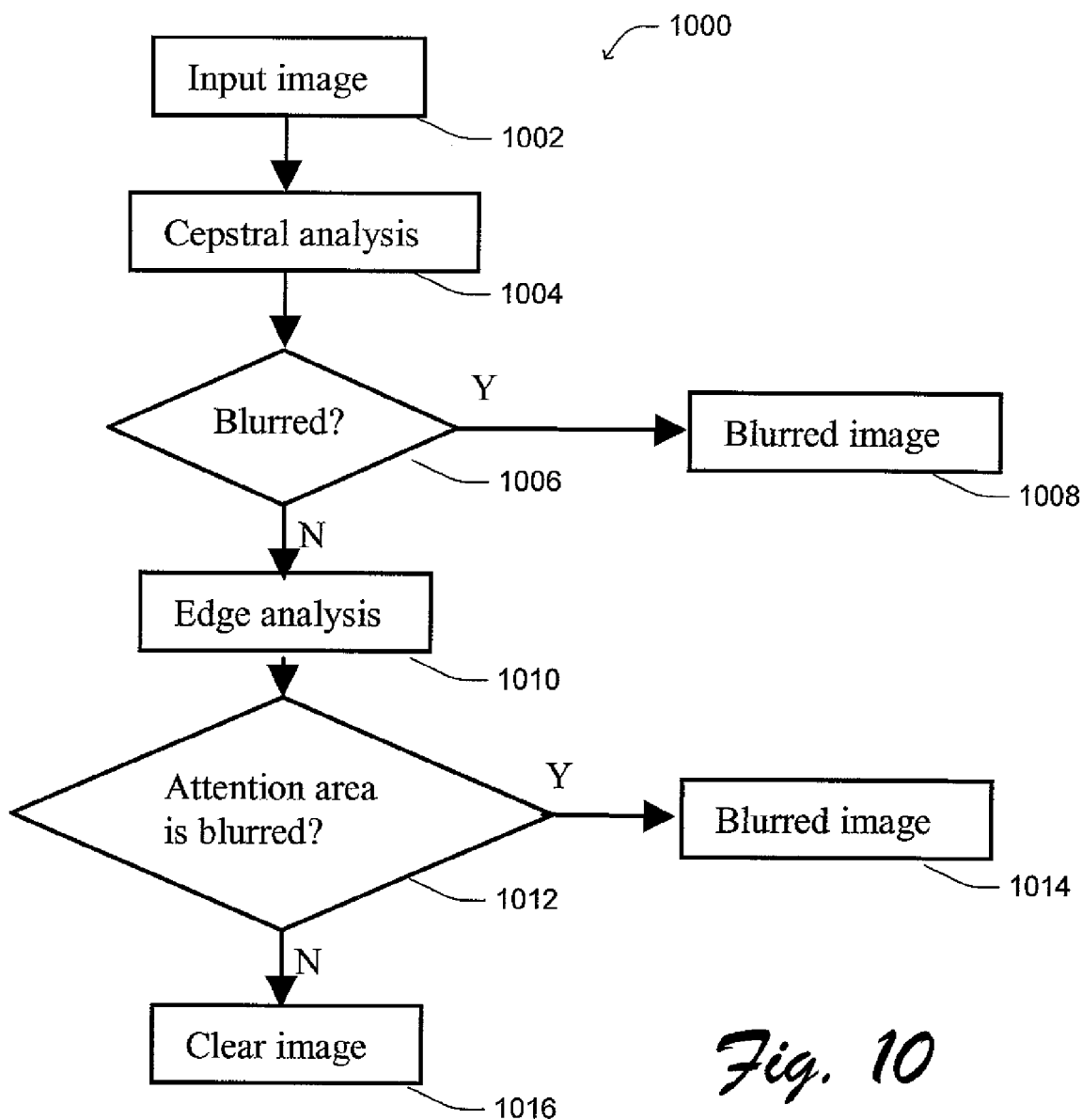
FIG. 10 is a flow diagram depicting a hierarchical scheme/method for use in detecting blur in a digital image using Wavelet transform and Cepstral analysis, in accordance with certain exemplary implementations of the present invention.

Reference is now made to FIG. 10, which is a flow diagram depicting a method 1000, in accordance with certain further implementations of the present invention.

In Act 1002, an image is input, captured, downloaded, or otherwise accessed. In Act 1004, Cepstral analysis, for example, as described above, is performed on at least a portion of the image. In Act 1006 a decision is made as to whether the image or portion thereof is blurred and if it is (Y), then in act 1008 the image is deemed to be blurred and additional processing may then be conducted, for example, to sharpen the image. If the decision in Act 1006 is that the image is not blurred (N), then method 1000 continues to Act 1010.

In Act 1010, an edge analysis is conducted, for example as described above, using a Wavelet transform or other like techniques. In Act 1012, a decision is made as to whether at least one attention area within the image or a portion thereof is blurred based on the edge analysis and if it is (Y), then in act 1014 the image is deemed to be blurred and additional processing may then be conducted, for example, to sharpen the image. If the decision in Act 1006 is that the image is not blurred (N), then method 1000 continues to Act 1016, wherein the image is considered to be "clear" (e.g., not significantly blurred).

Figure 11:
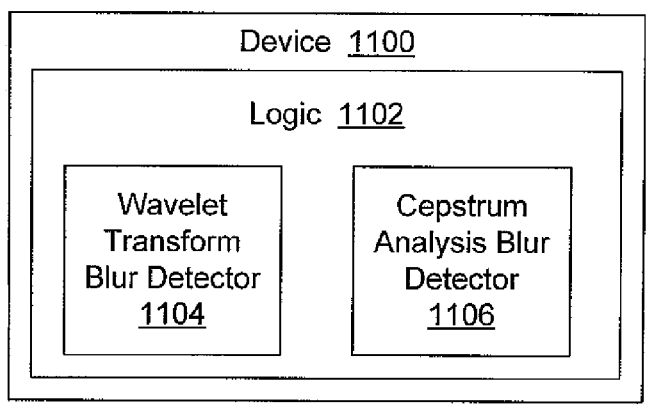
FIG. 11 is a block diagram depicting a device having logic in accordance with certain exemplary implementations of the present invention.

A representative device 1100 is depicted in FIG. 11 as having logic 1102 operatively configured therein. Logic 1102 is configured to perform all or part of the methods, techniques, schemes, etc., presented herein to detect image blurring. Here, logic 1102 includes a wavelet transform blur detector 1104 and a Cepstrum analysis blur detector 1106. Wavelet transform blur detector 1104 may include logic to perform method 700 (FIG. 7) and/or Acts 1010-1014 (FIG. 10), for example. Cepstrum analysis blur detector 1106 may include logic to perform method 900 (FIG. 9) and/or Acts 1004-1008 (FIG. 10), for example. Logic 1102 may also be configured in accordance with any other methods as described herein.

Device 1100 may include any applicable device(s)/machine(s) that process or otherwise handle image data. Thus, for example, device 1100 may include a computer, a camera, a set top box, an optical disc player/recorder, a portable communication device, a display device, a television set, a projector, and/or any other like device(s).

Those skilled in the art will recognize that the above-described exemplary methods and apparatuses are also fully adaptable for use with a variety of color and monochrome image data, including, for example, RGB data, YUV data, CMYK data, etc.

Although some preferred embodiments of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
 accessing at least a portion of a digital image;
 determining if at least said portion is blurred based on a wavelet transform blur detection process, wherein the wavelet transform blur detection process comprises:
  wavelet transforming at least said portion of said digital image to produce a plurality of corresponding different resolution levels, each resolution level including a plurality of bands;
  generating at least one edge map for each of said resolution levels; and
  detecting blur in at least said portion of said digital image based on said resulting edge maps by:
   normalizing a total edge amplitude of said edge map;

$E\text{map}_i(k,l) = E\text{map}_i(k,l)/\max(E\text{map}_i)$;

partitioning said edge map into edge map blocks;
   determining a maximal edge amplitude in each of said edge map blocks and using it to represent the respective edge map block; and
   using $E\max_i$ to denote a discretization result of $E\text{map}_i$ for each of said edge map blocks.

2. A method comprising:
 accessing at least a portion of a digital image; and
 determining if at least said portion is blurred based on a wavelet transform blur detection process, wherein the wavelet transform blur detection process includes;
  wavelet transforming at least said portion of said digital image to produce a plurality of corresponding different resolution levels, each resolution level includinq a plurality of bands;
  generating at least one edge map for each of said resolution levels, wherein $I_{iv}, I_{ih}, I_{id}$ denote $LH_i, HL_i, HH_i$ bands, respectively, and wherein generating said at least one edge map for each of said resolution levels includes constructing said edge map in scale i as follows:

$$E\text{map}_i(k,l) = \sqrt{I_{iv}^2(k,l) + I_{ih}^2(k,l) + I_{id}^2(k,l)}$$

where (k,l) is the coordinate of a pixel in scale i; and
detecting blur in at least said portion of said digital
image based on said resulting edge maps.

3. The method as recited in claim 2, wherein detecting blur in at least said portion of said digital image based on said resulting edge maps further includes:
comparing amplitude variations of corresponding edge nodes in at least two different edge maps of at least two different levels, and
wherein comparing said amplitude variations includes generating a difference map Dmap based on $$Dmap(i, j) = \sqrt{(Emax_3(i, j) - Emax_2(i, j))^2 + (Emax_2(i, j) - Emax_1(i, j))^2}.$$

4. A method comprising:
accessing at least a portion of a digital image; and
determining if at least said portion is blurred based on a wavelet transform blur detection process, wherein the wavelet transform blur detection process includes:
wavelet transforming at least said portion of said digital image to produce a plurality of corresponding different resolution levels, each resolution level including a plurality of bands;
generating at least one edge map for each of said resolution levels; and
detecting blur in at least said portion of said digital image based on said resulting edge maps by comparing amplitude variations of corresponding edge nodes in at least two different edge maps of at least two different levels.

5. The method as recited in claim 4, wherein comparing said amplitude variations includes generating a difference map.

6. The method as recited in claim 5, wherein detecting blur in at least said portion of said digital image based on said resulting edge maps further includes:
generating a binary difference map BDmap such that, $BDmap(i,j)=1$ if $Dmap(i,j)>t1$ $BDmap(i,j)=0$ otherwise where t1 is a first threshold value; and
determining that at least one edge map block (i, j) is blurred if said corresponding BDmap(i,j)=1.

7. The method as recited in claim 6, further comprising:
determining that at least said portion of said digital image is blurred if an applicable percentage of edge map blocks are determined to be blurred exceeds a second threshold value.

8. The method as recited in claim 4, wherein in said difference map a position of a plurality of relatively large amplitude values corresponds to at least one blurred edge.

9. A computer-readable medium having computer-implementable instructions suitable for causing at least one processing unit to perform acts comprising:
determining if at least a portion of a digital image is motion blurred or out-of-focus blurred based on a wavelet transform blur detection process that includes;
wavelet transforming at least said portion of said digital image to produce a plurality of corresponding different resolution levels, each resolution level including a plurality of bands;
generating at least one edge map for each of said resolution levels; and
detecting blur in at least said portion of said digital image based on said resulting edge mars by normalizing each of said resulting edge maps, wherein normalizing each of said resulting edge maps further includes;
normalizing a total edge amplitude of said edge map:

$Emap_i(k,l)=Emap_i(k,l)/\max(Emap_i);$ partitioning said edge map into edge map blocks;
determining a maximal edge amplitude in each of said edge map blocks and using it to represent the respective edge map block; and
using $Emax_i$ to denote a discretization result of $Emap_i$ for each of said edge map blocks.

10. A computer-readable medium having computer-implementable instructions suitable for causing at least one processing unit to perform acts comprising:
determining if at least a portion of a digital image is motion blurred or out-of-focus blurred based on a wavelet transform blur detection orocess that includes;
wavelet transforming at least said portion of said digital image to produce a plurality of corresponding different resolution levels, each resolution level including a plurality of bands;
generating at least one edge map for each of said resolution level, wherein $I_{iv}, I_{ih}, I_{id}$ denote $LH_i, HL_i, HH_i$ bands, respectively, and wherein generating said at least one edge map for each of said resolution levels further includes constructing said edge map in scale i as follows:

$$Emap_i(k, l) = \sqrt{I_{iv}^2(k, l) + I_{ih}^2(k, l) + I_{id}^2(k, l)}$$

where (k, l) is the coordinate of a pixel in scale i; and
detecting blur in at least said portion of said digital image based on said resulting edge maps.

11. The computer-readable medium as recited in claim 10, wherein detecting blur in at least said portion of said digital image based on said resulting edge maps further includes:
comparing amplitude variations of corresponding edge nodes in at least two different edge maps of at least two different levels, and
wherein comparing said amplitude variations includes generating a difference map Dmap based on $$Dmap(i, j) = \sqrt{(Emax_3(i, j) - Emax_2(i, j))^2 + (Emax_2(i, j) - Emax_1(i, j))^2}.$$

12. A computer-readable medium having computer-implementable instructions suitable for causing at least one processing unit to perform acts comprising:
determining if at least a portion of a digital image is motion blurred or out-of-focus blurred based on a wavelet transform blur detection process that includes:
wavelet transforming at least said portion of said digital image to produce a plurality of corresponding different resolution levels, each resolution level including a plurality of bands;
generating at least one edge map for each of said resolution levels; and detecting blur in at least said portion of said digital image based on said resulting edge maps by comparing amplitude variations of corresponding edge nodes in at least two different edge maps of at least two different levels.

13. The computer-readable medium as recited in claim 12, wherein comparing said amplitude variations includes generating a difference map.

14. The computer-readable medium as recited in claim 13, wherein detecting blur in at least said portion of said digital image based on said resulting edge maps further includes:
generating a binary difference map BDmap such that, $BDmap(i,j)=1$ if $Dmap(i,j)>t1$ $BDmap(i,j)=0$ otherwise where t1 is a first threshold value; and
determining that at least one edge map block (i, j) is blurred if said corresponding BDmap(i,j)=1.

15. The computer-readable medium as recited in claim 14, further comprising:
determining that at least said portion of said digital image is blurred if an applicable percentage of edge map blocks are determined to be blurred exceeds a second threshold value.

16. The computer-readable medium as recited in claim 12, wherein in said difference map a position of a plurality of relatively large amplitude values corresponds to at least one blurred edge.

17. An apparatus comprising:
logic operatively configured to access digital image data and determine if at least a portion of said image is blurry using a wavelet transform blur detector operatively configured to;
wavelet transform at least said portion to produce a plurality of corresponding different resolution levels with each resolution level including a plurality of bands;
generate at least one edge map for each of said resolution levels;
normalize each of said resulting edge maps by normalizing a total edge amplitude of said edge map such that $Emap_i(k,l)=Emap_i(k,l)/\max(Emap_i)$, partitions said edge map into edge map blocks, and determines a maximal edge amplitude in each of said edge map blocks and uses it to represent the respective edge map block, and using $Emax_i$ denotes a discretization result of $Emap_i$ for each of said edge map blocks; and
detect blur in at least said portion of said digital image based on said resulting edge maps.

18. The apparatus as recited in claim 17, wherein said apparatus includes at least one device selected from a group of devices comprising a computer, a camera, a set top box, an optical disc player, an optical disc player recorder, a portable communication device, a display device, a television set, and a projector.

19. An apparatus comprising:
logic operatively configured to access digital image data and determine if at least a portion of said image is blurry using a wavelet transform blur detector that is operatively configured to;
wavelet transform at least said portion to produce a plurality of corresponding different resolution levels with each resolution level including a plurality of bands;
generate at least one edge map for each of said resolution levels, wherein $I_{iv}, I_{ih}, I_{id}$ denote $LH_i, HL_i, HH_i$ bands, respectively, by constructing said edge map in scale i as follows:

$$Emap_i(k,l) = \sqrt{I_{iv}^2(k,l) + I_{ih}^2(k,l) + I_{id}^2(k,l)}$$

where (k, l) is the coordinate of a pixel in scale i; and
detect blur in at least said portion of said digital image based on said resulting edge maps.

20. The apparatus as recited in claim 19, wherein said wavelet transform blur detector compares amplitude variations of corresponding edge nodes in at least two different edge maps of at least two different levels, and generates a difference map Dmap based on $$Dmap(i,j) = \sqrt{(Emax_3(i,j) - Emax_2(i,j))^2 + (Emax_2(i,j) - Emax_1(i,j))^2}.$$

21. The apparatus as recited in claim 19, wherein said apparatus includes at least one device selected from a group of devices comprising a computer, a camera, a set top box, an optical disc player, an optical disc player recorder, a portable communication device, a display device, a television set, and a projector.

22. An apparatus comprising:
logic operatively configured to access digital image data and determine if at least a portion of said image is blurry using a wavelet transform blur detector that is operatively configured to:
wavelet transform at least said portion to nroduce a plurality of corresponding different resolution levels with each resolution level including a olurality of bands;
generate at least one edge map for each of said resolution levels;
compare amplitude variations of corresponding edge nodes in at least two different edge maps of at least two different levels; and
detect blur in at least said portion of said digital image based on said resulting edge maps.

23. The apparatus as recited in claim 22, wherein said wavelet transform blur detector generates a difference map.

24. The apparatus as recited in claim 23, wherein said wavelet transform blur detector generates a binary difference map BDmap such that, $BDmap(i,j)=1$ if $Dmap(i,j)>t1$ $BDmap(i,j)=0$ otherwise where t1 is a first threshold value; and
determines that at least one edge map block (i, j) is blurred if said corresponding BDmap(i,j)=1.

25. The apparatus as recited in claim 24, wherein said wavelet transform blur detector determines that at least said portion of said digital image is blurred if an applicable percentage of edge map blocks are determined to be blurred exceeds a second threshold value.

26. The apparatus as recited in claim 22, wherein in said difference map a position of a plurality of relatively large amplitude values corresponds to at least one blurred edge.

27. The apparatus as recited in claim 22, wherein said apparatus includes at least one device selected from a group of devices comprising a computer, a camera, a set top box, an optical disc player, an optical disc player recorder, a portable communication device, a display device, a television set, and a projector.

* * * * *